(12) United States Patent
Kopf et al.

(10) Patent No.: US 6,744,237 B2
(45) Date of Patent: Jun. 1, 2004

(54) HYBRID POWER SYSTEM FOR AN ELECTRIC VEHICLE

(75) Inventors: Bruce M. Kopf, Grosse Pointe Shores, MI (US); Jing Song, Novi, MI (US); Yi Ding, Canton, MI (US)

(73) Assignee: Ford Global Technologies, LLC

( * ) Notice: Subject to any disclaimer, the term of this patent is extended or adjusted under 35 U.S.C. 154(b) by 0 days.

(21) Appl. No.: 10/063,195

(22) Filed: Mar. 28, 2002

(65) Prior Publication Data

US 2003/0184256 A1 Oct. 2, 2003

(51) Int. Cl.$^7$ .................................................. H02J 7/00
(52) U.S. Cl. ....................................................... 320/104
(58) Field of Search ................................ 320/101, 104, 320/132; 429/22, 23; 701/22; 180/65.1, 307; 318/139, 382, 376; 290/11, 16, 27, 40 C; 322/7, 8, 10, 19, 21, 22, 28, 36, 45; 60/698, 706

(56) References Cited

U.S. PATENT DOCUMENTS

| 4,839,574 A | 6/1989 | Takabayashi ................ 320/101 |
| 4,931,947 A | 6/1990 | Werth et al. ................. 320/110 |
| 4,961,151 A | 10/1990 | Early et al. .................. 700/297 |
| 4,962,462 A | 10/1990 | Fekete, deceased ......... 700/297 |
| 5,212,431 A | * 5/1993 | Origuchi et al. ............. 318/139 |
| 5,631,532 A | 5/1997 | Azuma et al. ............... 320/102 |
| 5,713,426 A | 2/1998 | Okamura ..................... 180/65.3 |
| 5,808,448 A | 9/1998 | Naito ........................... 322/13 |
| 5,820,172 A | * 10/1998 | Brigham et al. ........... 290/40 C |
| 6,158,537 A | * 12/2000 | Nonobe ....................... 180/65.3 |
| 6,175,217 B1 | * 1/2001 | Da Ponte et al. ............. 322/19 |
| 6,230,496 B1 | * 5/2001 | Hofmann et al. ............. 60/706 |
| 6,495,277 B1 | * 12/2002 | Edlund et al. ................ 429/22 |
| 6,534,950 B2 | * 3/2003 | LeBoe ......................... 320/104 |
| 6,580,977 B2 | * 6/2003 | Ding et al. ................... 701/22 |

* cited by examiner

*Primary Examiner*—Pia Tibbits
(74) *Attorney, Agent, or Firm*—Dykema Gossett; Carlos L. Hanze

(57) ABSTRACT

A hybrid power system (10) for supplying power to a load (12) such as an electric vehicle is provided. The power system (10) includes an energy storage device (14) and a fuel cell system (16). When the state of charge of the energy storage device (14) is greater than or equal to a predetermined state of charge, the energy storage device (14) supplies all of the power to the load (12). When the state of charge of the energy storage device (14) falls below the predetermined state of charge, the fuel cell system (16) supplies at least a portion of the power to the load (12). In accordance with one aspect of the invention, the fuel cell system (16) then supplies all of the power to the load (12) as long as the power requirement of the load (12) does not exceed an optimal power output of the fuel cell system (16).

20 Claims, 2 Drawing Sheets

HYBRID POWER SYSTEM FOR AN ELECTRIC VEHICLE

BACKGROUND OF INVENTION

This invention relates to electric vehicles and, in particular, to power systems for electric vehicles.

Conventional electric vehicles often include a hybrid power system including both a battery and a fuel cell. See, e.g., U.S. Pat. Nos. 4,839,574; 4,931,947; 4,961,151; 4,962,462; 5,631,532; and 5,808,448. Hybrid power systems are used because conventional batteries lack sufficient charge when used alone to enable travel over long distances and also require relatively long periods of time to charge. Further, conventional fuel cells are unable to generate sufficient power when used alone to accommodate wide variations in the power requirements of the vehicle. Conventional fuel cells also have long start times in cold ambient temperatures and respond slowly to changes in vehicle power requirements.

Most conventional hybrid power systems used in electric vehicles include a relatively large fuel cell that is used as the primary power source for the vehicle and a relatively small battery that is used as a secondary power source when vehicle power requirements exceed the maximum power output of the fuel cell. These conventional hybrid power systems are disadvantageous, however, because fuel cells are relatively expensive and the overall power system still responds slowly to changes in vehicle power requirements.

SUMMARY OF INVENTION

The present invention provides a hybrid power system for supplying power to a load such as an electric vehicle. A hybrid power system in accordance with the present invention includes an energy storage device, such as a battery, and a fuel cell. The energy storage device supplies all of the power to the load as long as the state of charge of the energy storage device is greater than a first predetermined state of charge. The fuel cell supplies at least a portion of the power to the load when the state of charge of the energy storage device is less than or equal to the first predetermined state of charge.

In accordance with additional aspects of the present invention, the amount of power provided by the energy storage device and the fuel cell may be varied responsive to certain operating conditions to optimize the efficiency of the power as; system. In particular, the fuel cell may supply all of the power to the load when the state of charge of the energy storage device falls below a second predetermined state of charge. When the energy storage device's state of charge falls between the first and second predetermined states of charge, the fuel cell may supply all of the power to the load as long as the power requirement of the load is less than or equal to an optimal power output of the fuel cell. When the power requirement of the load exceeds the optimal power output of the fuel cell, both the energy storage device and fuel cell may supply power to the load.

A method in accordance with the present invention for supplying power to a load includes the step of providing an energy storage device and a fuel cell. The method further includes the step of controlling the energy storage device and fuel cell wherein the energy storage device supplies all of the power to the load when the state of charge of the energy storage device is greater than a first predetermined state of charge and the fuel cell provides at least a portion of the power when the state of charge of the energy storage device is less than or equal to the first predetermined state of charge.

The present invention represents an improvement as compared to conventional hybrid power systems because the inventive power system does not require a large fuel cell and, therefore, is less expensive than conventional power systems. Further, the inventive power system is able to respond relatively quickly to variations in power requirements by the load. Finally, the inventive power system controls the energy storage device and fuel cell so as to optimize the power generating capabilities of the energy storage device and fuel cell.

These and other advantages of this invention will become apparent to one skilled in the art from the following detailed description and the accompanying drawings illustrating features of this invention by way of example.

DETAILED DESCRIPTION

Figure 1:
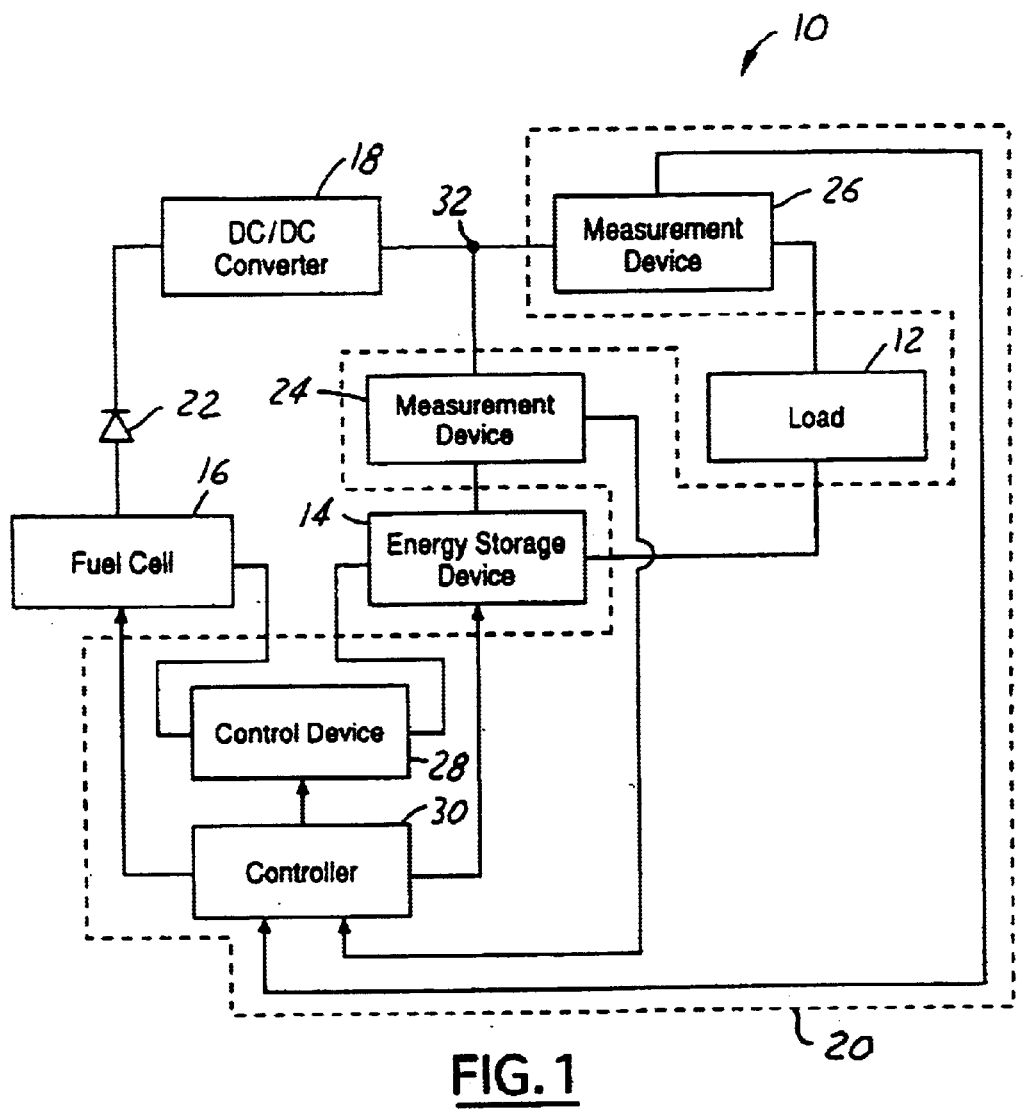
FIG. 1 is a schematic and block diagram illustrating a hybrid power system in accordance with the present invention.

Referring now to the drawings wherein like reference numerals are used to identify identical components in the various views, FIG. 1 illustrates a hybrid power system in accordance with the present invention for supplying power to a load 12. Power system 10 may includes an energy storage device 14, a fuel cell system 16, a converter 18, and a control circuit 20 for controlling storage device 14 and fuel cell system 16. In accordance with the present invention load 12 may comprises an electric vehicle. It should be understood, however, that the present invention may be used to supply power to other types of loads.

Storage device 14 provides power to load 12. Device 14 may also be used to energize fuel cell system 16 to meet the power requirements of fuel cell accessories. Device 14 is conventional in the art and may comprise a battery pack including any of a variety of conventional batteries including, but not limited to, a lead-acid battery, a sodium sulfur (Na/S) battery, a sodium nickel chloride (Na/NiCl$_2$) battery, a nickel cadmium (Ni/Cd) battery, a nickel metal hydride battery, a lithium ion battery or a lithium polymer battery. Alternatively, device 14 may comprise an ultracapacitor (a high energy density capacitor) including, for example, a parallel plate or double layer ultracapacitor. In one embodiment of the invention, device 14 may generate between about 10 KW and about 100 KW of power.

Fuel cell system 16 also provides power to load 12. System 16 is also provided to charge storage device 14 when the state of charge of storage device 14 is less than or equal to a predetermined state of charge. System 16 is conventional in the art and may include one or more fuel cells comprising any of a variety of conventional fuel cells including, but not limited to, a polymer electrolyte membrane fuel cell (PEMFC), a solid oxide fuel cell (SOFC), an alkaline fuel cell (AFC), a phosphoric acid fuel cell (PAFC or molten carbonate fuel cell (MCFC). The fuel cells of system 16 may operate on direct hydrogen, direct methanol or a reformulated fuel. In one embodiment of the invention, system 16 may generate between about 5 KW and about 60 KW of power and, more preferably, between about 20 KW and about 40 KW of power. In the illustrated embodiment, system 16 is connected in parallel with storage device 14. A diode 22 may be connected in series with system 16 to prevent system 16 from being charged by storage device 14. As described in greater detail hereinbelow, system 16 may operate in one of two steady modes responsive to the state of charge of storage device 14 wherein system 16 generates either an optimally efficient output power or a predetermined maximum output power. Although not required by the present invention, limiting operation of system 16 to two or several steady modes is advantageous in limiting parasitic losses due to power variation, simplifying control of system 16 and power system 10, avoiding thermal fatigue of system 16, and achieving stable operation with a reformer system. The mode of operation wherein system 16 generates an optimally efficient output power is likely to occur in an electric vehicle, for example, when the vehicle is placed in cruise control and/or during highway driving. As will be understood by those of skill in the art, the optimally efficient output power of system 16 may be determined in a variety of ways such as, for example, determining the average current required by load 12 over a period of time.

Converter 18 is provided to balance the voltage between storage device 14 and fuel cell system 16. Converter 18 may comprise a conventional DC/DC converter. Converter 18 may be connected in series with system 16 and in parallel with storage device 14 and load 12.

Control circuit 20 is provided to control storage device 14 and fuel cell system 16. Circuit 20 may include measurement devices 24, 26, a control device 28, and a controller 30.

Measurement devices 24, 26 are provided to measure current and/or voltage generated by storage device 14 and fuel cell system 16. Devices 24, 26 are conventional in the art and may, for example, comprise conventional ampmeters. Device 24 may be connected in series with storage device 14 and may be used to measure charge currents input to storage device 14 and discharge currents output by storage device 14. Device 26 may be coupled between a common node 32 and load 12 and may be used to measure load currents. Devices 24, 26 may each generate one or more control signals that are provided to controller 30.

Control device 28 is provided to selectively activate fuel cell system 16. Device 28 is conventional in the art any may comprise a conventional switching device. It should be understood by those of skill in the art that switching device may assume any of a plurality of conventional forms including a conventional transistor or a relay.

Controller 30 is provided to control storage device 14 and fuel cell system 16. Controller 30 may comprise a microprocessor operating under the control of a set of programming instructions (i.e., software). It should be understood, however, that controller 30 may also be implemented using discrete digital and/or analog circuits. Controller 30 may receive input signals from, for example, measurement devices 24, 26. Controller 30 may also generate output signals used to control storage device 14, fuel cell system 16, and control device 28.

Controller 30 controls storage device 14 and fuel cell system 16 responsive to certain operating conditions and may operate in accordance with the following table (wherein SOC indicates the state of charge of storage device 14, $SOC_L$ indicates a predetermined lower state of charge of storage device 14, $SOC_U$ indicates a predetermined upper state of charge of storage device 14, $P_{FCOPT}$ indicates an optimal power output for fuel cell system 16, $P_{REQ}$ indicates the power requirement of load 12 (which includes the fuel cell parasitic load) and $X_1$ and $X_2$ are predetermined values):

| CONDITION | ENERGY STORAGE DEVICE | FUEL CELL | CONTROL (S) |
|---|---|---|---|
| 1. $SOC < SOC_L$ | Disabled | Discharges at the level required (up to a maximum output of the fuel cell) to provide power to the load and charge storage device at the highest charging rate. | If $SOC >= SOC_L$ + go to condition 2. |
| 2. $SOC_U > SOC > SOC_L$ | Discharges if $P_{REQ} > P_{FCOPT}$. Charges if $P_{REQ} <= P_{FCOPT}$. | Discharges at optimum efficient level $P_{FCOPT}$. | If $SOC >= SOC_U$, go to condition 3. If $SOC < SOC_L$, go to condition 1. |
| 3. $SOC > SOC_U$ | Discharges | Disabled or provides power to other systems. | If $SOC < SOC_U - X_1$, go to condition 2. |
| 4. Regenerative braking | Charges until SOC reaches a predetermined value. | Disabled or provides power to other systems. | |
| 5. No fuel | Discharges | Disabled | If $SOC < SOC_L$ disable storage device. |

As set forth in the above table, controller 30 may operate based on one or more operating principles in accordance with the present invention. First, as long as the state of charge SOC of storage device 14 is greater than a predetermined upper state of charge $SOC_U$, storage device 14 supplies all of the power to load 12. The predetermined upper state of charge $SOC_U$ may be between about seventy percent (70%) and about ninety percent (90%). Second, when the state of charge SOC is less than or equal to the predetermined upper state of charge $SOC_U$, fuel cell system 16 supplies at least a portion of the power to load 12. Third, when the state of charge SOC of storage device 14 falls below the predetermined lower state of charge $SOC_L$, fuel cell system 16 supplies all of the power to load 12. The predetermined lower state of charge $SOC_L$ may be between about twenty percent (20%) and about fifty percent (50%). Fourth, when the state of charge SOC of storage device 14 is between the predetermined upper and lower states of charge $SOC_U$, $SOC_L$, fuel cell system 16 supplies all of the power to load 12 as long as the power requirement $P_{REQ}$ of load 12 is less than or equal to the optimal power output $P_{FCOPT}$ of fuel cell system 16. Where the power requirement $P_{REQ}$ exceeds the optimal power output $P_{FCOPT}$ of fuel cell system 16, storage device 14 provides the additional power required. Fifth, when the state of charge SOC of storage device 14 is less than the predetermined upper state of charge $SOC_U$, fuel cell system 16 discharges to charge storage device 14.

Figure 2:
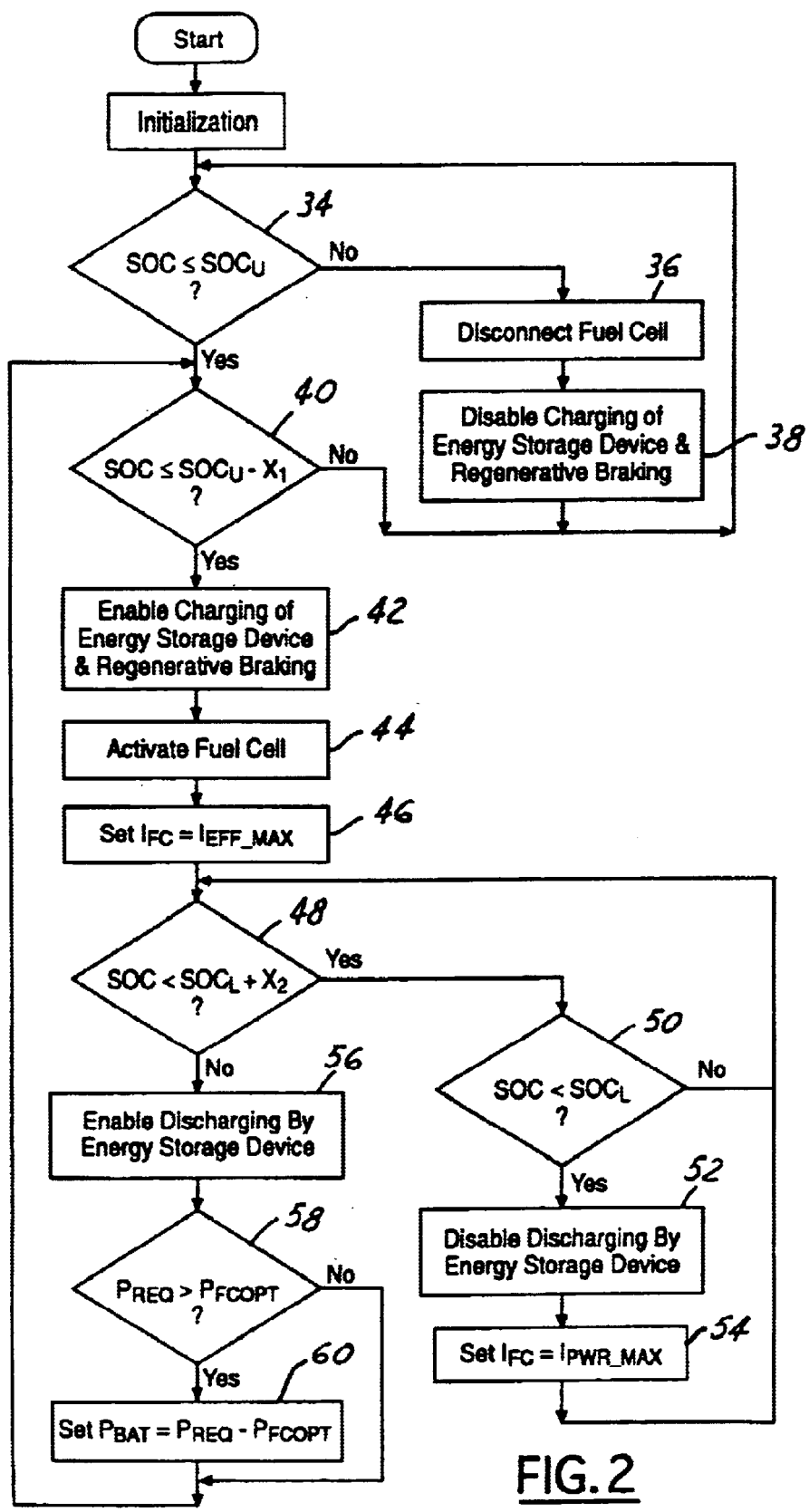
FIG. 2 is a flow chart diagram illustrating a method for supplying power to a load in accordance with the present invention.

Referring now to FIGS. 1 and 2, a method of supplying power to a load 12 is illustrated. The method may include the steps of providing storage device 14 and fuel cell system 16 and configuring storage device 14 and system 16 to supply power to load 12. The method further includes the step of controlling storage device 14 and system 16.

Referring now to FIG. 2, storage device 14 and fuel cell system 16 may be controlled in accordance with a predetermined algorithm having a plurality of substeps. It should be understood, however, that the algorithm illustrated in FIG. 2 may be varied in a variety of ways without departing from the scope of the present invention. For example, the conditions under which comparisons relating to the state of charge of storage device 14 are made may be varied and the order of certain substeps may also be varied while still achieving the same results.

The algorithm may begin with a substep 34 of comparing the state of charge SOC of storage device 14 to a predetermined upper state of charge $SOC_U$. As long as the state of charge SOC of storage device 14 is greater than predetermined upper state of charge $SOC_U$, storage device 14 continues to provide all of the power to load 12 and controller 30 may implement several substeps 36, 38. First, fuel cell system 16 may be deactivated in accordance with substep 36 to prevent system 16 from discharging. Referring to FIG. 1, controller 30 may generate a control signal to deactuate control device 28 and thereby deactivate system 16. Referring again to FIG. 2, controller 30 may also cease allowing charging of storage device 14 (including during regenerative braking) in accordance with substep 38 to protect storage device 14 from being overcharged. It will be understood by those of skill in the art that controller 30 may implement substep 38 through, for example, control of one or more discrete electronic elements for routing charging currents to storage device 14 responsive to control signals generated in accordance with software commands.

If the state of charge SOC of storage device 14 is less than or equal to the predetermined upper state of charge $SOC_U$, controller 30 may perform the substep of 40 of comparing the state of charge SOC of storage device 14 to another predetermined state of charge $SOC_{M1}$. This state of charge may be defined as the predetermined upper state of charge $SOC_U$ minus a predetermined value $X_1$. The predetermined state of charge $SOC_{M1}$ is greater than a predetermined lower state of charge $SOC_L$ of storage device 14. As long as the state of charge SOC of storage device 14 is greater than predetermined state of charge $SOC_{M1}$, storage device 14 continues to provide all of the power to load 12.

If the state of charge SOC of storage device 14 is less than or equal to $SOC_{M1}$, controller 30 may perform several substeps 42, 44, 46, 48. First, controller 30 may enable charging of storage device 14 (including through regenerative braking) in accordance with substep 42. It will again be understood by those of skill in the art that controller 30 may implement substep 42 through, for example, control of one or more discrete electronic elements for routing charging currents to storage device 14 responsive to control signals generated in accordance with software commands. The use of two separate values, $SOC_{M1}$ and $SOC_U$, to enable and disable, respectively, charging of storage device 14 during regenerative braking is advantageous because it prevents undesirable oscillations responsive to changes in the state of charge SOC of storage device 14.

Next, fuel cell system 16 may be activated in accordance with substep 44 and begin to discharge. Referring to FIG. 1, controller 30 may generate a control signal to actuate control device 28 and thereby activate system 16. Referring again to FIG. 2, controller 30 may next set the output current $I_{FC}$ of system 16 to a current $I_{eff\_max}$ in accordance with substep 46. $I_{eff\_max}$ is selected to produce a predetermined optimally efficient output power $P_{FCOPT}$ for system 16. Finally, controller 30 may perform the substep 48 of comparing the state of charge SOC of storage device 14 to a predetermined state of charge $SOC_{M2}$. $SOC_{M2}$ may be defined as the predetermined lower state of charge $SOC_L$ plus a predetermined value $X_2$ and is less than predetermined upper state of charge $SOC_U$.

If the state of charge SOC of storage device 14 is less than $SOC_{M2}$, controller 30 may perform the substep 50 of comparing the state of charge SOC of storage device 14 to predetermined lower state of charge $SOC_L$. If the state of charge SOC of storage device 14 is greater than or equal to the predetermined lower state of charge $SOC_L$, controller 30 may repeat the comparison set forth in substep 48. If the state of charge SOC of storage device 14 is less than the predetermined lower state of charge $SOC_L$, however, controller 30 may implement several substeps 52, 54. First, controller 30 may disconnect storage device 14 in accordance with substep 52 to prevent storage device 14 from further discharging current. Next, controller 30 may direct fuel cell system 16 to discharge a predetermined maximum output current $I_{pwr\_max}$ in accordance with substep 54 to provide power to load 12 and charge storage device 14. Upon completion of substeps 52, 54, controller 30 may repeat the comparison set forth in substep 48.

In accordance with substep 48, if the state of charge SOC of storage device 14 is less than predetermined state of charge $SOC_{M2}$, controller 30 may perform several substeps 56, 58. First, controller 30 may enable discharging of current from storage device 14 in accordance with substep 56. Controller 30 may then compare the power requirement $P_{REQ}$ of load 12 to the predetermined optimal power output $P_{FCOPT}$ of system 16 in accordance with substep 58.

If the power requirement $P_{REQ}$ of load 12 is less than or equal to the predetermined optimal power output $P_{FCOPT}$ of fuel cell system 16, system 16 supplies all of the power to load 12. Controller 30 may also control storage device 14 so as to allow storage device 14 to be charged with any current from system, 16 in excess of the current needed to provide power to load 12. If the power requirement $P_{REQ}$ of load 12 is greater than the predetermined optimal power output $P_{FCOPT}$ of system 16, controller 30 may control storage device 14 in accordance with substep 60 so as to cause storage device 14 to discharge current and thereby supply the additional current required to provide power to load 12. Controller 30 may then repeat the comparison of the state of charge SOC of storage device 14 to the predetermined state of charge $SOC_{M1}$ in accordance with substep 40.

The present invention represents a significant improvement as compared to conventional hybrid power systems. In particular, the inventive power system does not require a large fuel cell and, therefore, is less expensive than conventional power systems. Rather, the inventive power system utilizes an energy storage device such as a battery pack to provide power to the load as long as the state of charge of the storage device remains above a predetermined level. The fuel cell provides power to the load only when the state of charge of the storage device falls below the predetermined level. The fuel cell and storage device are then controlled in accordance with one aspect of the invention so as to optimize the power generating capabilities of the storage device and fuel cell. The inventive power system is also able to respond relatively quickly to variations in power requirements by the load unlike conventional power systems.

What is claimed is:

1. A hybrid power system for supplying power to a load, comprising:
    an energy storage device; and,
    a fuel cell system
    wherein said energy storage device supplies all of said power when a state of charge of said energy storage device is greater than a first predetermined state of charge and said fuel cell system provides at least a portion of said power when said state of charge of said energy storage device is less than or equal to said first predetermined state of charge.

2. The hybrid power system of claim 1 wherein said load comprises an electric vehicle.

3. The hybrid power system of claim 1 wherein said first predetermined state of charge is between about seventy percent and ninety percent.

4. The hybrid power system of claim 1 wherein said fuel cell system supplies all of said power when said state of charge of said energy storage device is less than a second predetermined state of charge.

5. The hybrid power system of claim 4 wherein said second predetermined state of charge is between about twenty percent and about fifty percent.

6. The hybrid power system of claim 1 wherein all of said power is supplied by said fuel cell system when said state of charge of said energy storage device is less than or equal to aid first predetermined state of charge and a power requirement of said load is less than or equal to an optimal power output of said fuel cell system.

7. The hybrid power system of claim 1 wherein said power is supplied by both said energy storage device and said fuel cell system when said state of charge of said energy storage device is less than or equal to said first predetermined state of charge and a power requirement of said load is greater than an optimal power output of said fuel cell system.

8. The hybrid power system of claim 1 wherein said fuel cell system charges said energy storage device when said state of charge of said energy storage device is less than or equal to said first predetermined state of charge.

9. A hybrid power system for supplying power to a load, comprising:

an energy storage device; and, a fuel cell system wherein said energy storage device supplies all of said power when a state of charge of said energy storage device is greater than a first predetermined state of charge, said fuel cell system supplies all of said power when said state of charge of said storage device is less than or equal to said first predetermined state of charge and a power requirement of said load is less than or equal to an optimal power output of said fuel cell system, and said energy storage device and said fuel cell both supply said power when said state of charge of said energy storage device is less than or equal to said first predetermined state of charge and said power requirement of said load is greater than said optimal power output of said fuel cell system.

10. The hybrid power system of claim 9 wherein said load comprises an electric vehicle.

11. The hybrid power system of claim 9 wherein said first predetermined state of charge is between about seventy percent and ninety percent.

12. The hybrid power system of claim 9 wherein said fuel cell system supplies all of said power when said state of charge of said energy storage device is less than a second predetermined state of charge.

13. The hybrid power system of claim 9 wherein said second predetermined state of charge is between about twenty percent and about fifty percent.

14. A method of supplying power to a load, comprising the steps of:

providing an energy storage device and a fuel cell system; and, controlling said energy storage device and said fuel cell system wherein said energy storage device supplies all of said power when a state of charge of said energy storage device is greater than a first predetermined state of charge and said fuel cell system provides at least a portion of said power when said state of charge of said energy storage device is less than or equal to said first predetermined state of charge.

15. The hybrid power system of claim 14 wherein said load comprises an electric vehicle.

16. The hybrid power system of claim 14 wherein said first predetermined state of charge is between about seventy percent and ninety percent.

17. The hybrid power system of claim 14 wherein said fuel cell system supplies all of said power when said state of charge of said energy storage device is less than a second predetermined state of charge.

18. The hybrid power system of claim 14 wherein said second predetermined state of charge is between about twenty percent and about fifty percent.

19. The hybrid power system of claim 14 wherein all of said power is supplied by said fuel cell system when said state of charge of said energy storage device is less than or equal to said first predetermined state of charge and a power requirement of said load is less than or equal to an optimal power output of said fuel cell system.

20. The hybrid power system of claim 14 wherein said power is supplied by both said energy storage device and said fuel cell system when said state of charge of said energy storage device is less than or equal to said first predetermined state of charge and a power requirement of said load is greater than an optimal power output of said fuel cell system.

* * * * *